June 1, 1926.
A. HADDOCK
1,587,120
MOUNTING FOR VACUUM TUBES
Filed Dec. 8, 1920
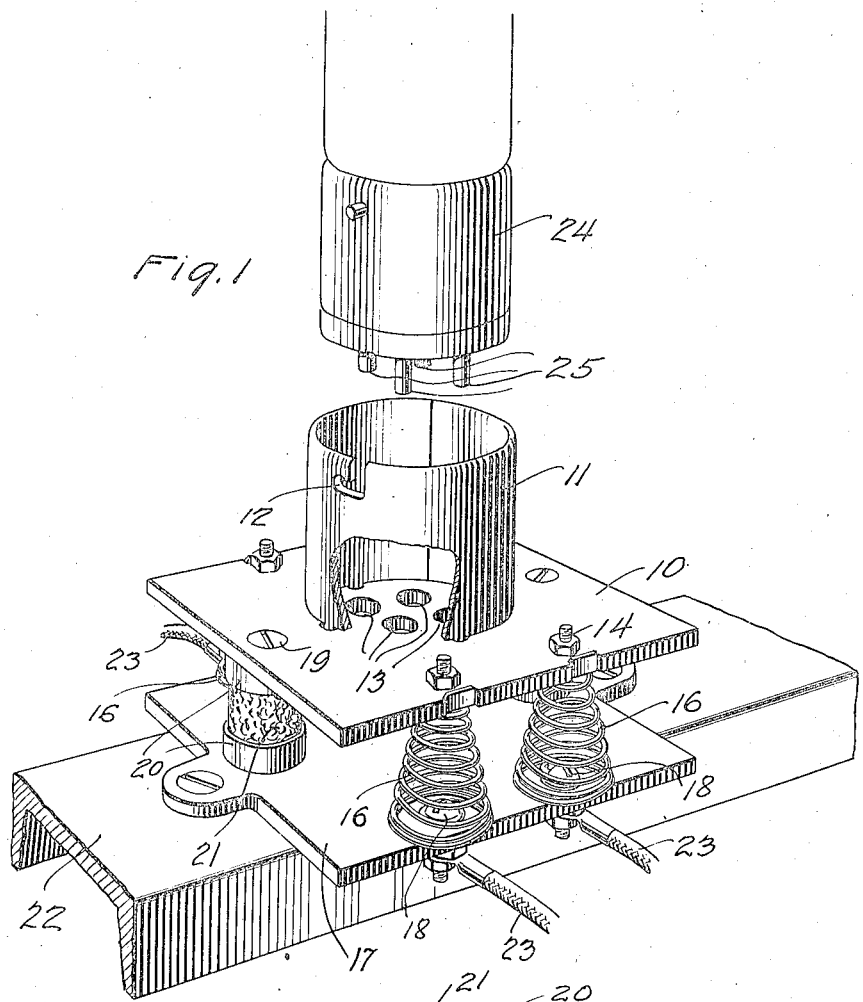
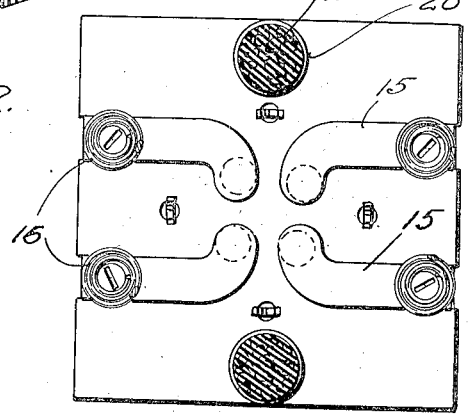
Inventor:
Arthur Haddock
by W. E. Beatty, Atty.

Patented June 1, 1926.

1,587,120

UNITED STATES PATENT OFFICE.

ARTHUR HADDOCK, OF EAST ORANGE, NEW JERSEY, ASSIGNOR TO WESTERN ELECTRIC COMPANY, INCORPORATED, OF NEW YORK, N. Y., A CORPORATION OF NEW YORK.

MOUNTING FOR VACUUM TUBES.

Application filed December 8, 1920. Serial No. 429,213.

This invention relates to mountings for vacuum tubes and an object thereof is to provide mountings for vacuum tubes of such nature as to protect them against injury from external blows or other disturbances.

As is well known it is essential for the proper operation of a vacuum tube that the various electrodes be maintained in a certain predetermined spaced arrangement relative to each other. Because of the comparatively light construction of the electrodes of a tube a slight blow is often effective to cause vibration of the electrodes which will vary their relation to such an extent that the efficiency of the tube is seriously impaired.

In accordance with this invention objectionable vibration of the electrodes is prevented by providing an elastic mounting for the tube so that any shock or vibration of its supporting structure will be absorbed without being appreciably transmitted to the electrodes. As one specific example of such a mounting it has been found that a tube mounted on conical springs and provided with a cushion of elastic material to damp the vibration is very effective for producing the effect desired. The connection of a tube carried by such a mounting with its circuits is greatly simplified by completing the electrical connection through the springs.

This invention will be better understood by having reference to the following specification and accompanying drawings wherein Figure 1 is a perspective view of the socket mounting and Figure 2 is a bottom view of the socket carrying member.

The member, 10, preferably of insulating material, carries the socket 11 which is provided with a bayonet slot 12. Apertures 13 extending through the member 10 are arranged within the socket and lie at the corners of a square. Attached to the under face of the member 10 by means of the bolts 14 are the resilient contact members 15. These contact members are arranged in pairs at opposite ends of the member 10 and each one of a pair has its inner end turned toward the opposite member thereof, each of said ends being arranged directly beneath and closing one of the apertures in said member. Attached to the contact members and to the member 10 by means of the bolts 14 are the conical springs 16 which are formed of electrically conducting material. The lower ends of these springs rest upon the base 17, which is also preferably of insulating material, and are attached thereto by means of the bolts 18 extending through the base, which bolts are adapted to also act as binding posts for making electrical connection with circuits.

Interposed between the opposing faces of the members 10 and 17 are cushions 21 of elastic material, such, for example as soft rubber. These cushions serve to damp the vibration of the member 10 and preferably are in the form of cylinders having their ends located in cups 20 attached to the members 10 and 17 by means of the screws 19.

This arrangement is effective to nullify the effect of any shocks or other disturbances to which the support may be subject. The springs 16 allow comparatively free movement of the member 10, while the cushion 21 is effective to damp any vibration impressed upon said member. In case the cushion 21 becomes hard after a period of usage it may be readily removed by forcing apart the members 10 and 17 sufficient to allow the ends of the cushion to clear the edges of the cup. A new cushion may be inserted in the same general manner.

In the use of this device the member 17 is mounted upon a suitable support 22 and the wires 23 of the various circuits are connected to the bolts 18 according to a predetermined arrangement. A vacuum tube 24 placed in the socket with its terminals 25 passing through the apertures 13 will then be electrically connected with the proper circuits through the medium of the contact members 15 and the springs 16. This arrangement prevents the possibility of the connections between the contact members and the wires of the circuit being broken due to vibration of the member 10.

Although this device is shown in the embodiment adapted for use in connection with a three electrode vacuum tube, it is to be understood that it may be adapted for a two electrode tube or other electrical device without exceeding the scope of the invention.

What is claimed is:—

1. In a device of the character described, a member for holding a vacuum tube, a base, resilient members supporting said holding member on said base, cups on the adjacent faces of said holding member and base, and a cylinder of elastic material having its ends arranged in said cups.

2. A device of the character described comprising a base, means for holding a vacuum tube, resilient electrical conductors for supporting said holding means on said base, resilient contact members on said holding means, said contact members and said conductors being electrically connected and means for damping vibration of said holding member.

3. A device of the character described comprising means for holding a vacuum tube, resilient means for supporting said holding means, contact members carried by said holding means, said resilient means and said contact members being electrically connected, and means including a cushion of non-metallic elastic material for damping the vibration of said holding means.

4. A device of the character described comprising a base member, a member for holding a vacuum tube, resilient electrical conductors supporting one of said members from the other contact members on said holding member, said contact members and said conductors being electrically connected, cups on the adjacent faces of said base and said holding member and cylinders of soft rubber arranged with the ends thereof in said cups.

5. A shock absorbing mounting for vacuum tubes comprising a socket having contact members to engage the terminal blocks of a vacuum tube, resilient electrical conductors supporting said socket, electrical connections between said conductors and said contact members and means for damping vibrations of said socket.

In witness whereof, I hereunto subscribe my name this 1st day of December A. D., 1920.

ARTHUR HADDOCK.